(12) United States Patent
Strand

(10) Patent No.: US 11,868,857 B2
(45) Date of Patent: Jan. 9, 2024

(54) VIDEO AUGMENTATION APPARATUS AND A METHOD FOR ITS USE

(71) Applicant: Fushap, Inc., Marshfield, MA (US)

(72) Inventor: Eric Strand, Marshfield, MA (US)

(73) Assignee: Fushap, Inc.

( * ) Notice: Subject to any disclaimer, the term of this patent is extended or adjusted under 35 U.S.C. 154(b) by 0 days.

(21) Appl. No.: 17/730,518

(22) Filed: Apr. 27, 2022

(65) Prior Publication Data

US 2022/0358406 A1    Nov. 10, 2022

Related U.S. Application Data

(60) Provisional application No. 63/180,897, filed on Apr. 28, 2021.

(51) Int. Cl.
*G06N 5/048* (2023.01)
*G06N 20/00* (2019.01)

(52) U.S. Cl.
CPC ............ *G06N 20/00* (2019.01); *G06N 5/048* (2013.01)

(58) Field of Classification Search
None
See application file for complete search history.

(56) References Cited

U.S. PATENT DOCUMENTS

| | | |
|---|---|---|
| 10,521,671 B2 | 12/2019 | Chang |
| 10,546,197 B2 | 1/2020 | Shrestha |
| 10,769,446 B2 | 9/2020 | Chang |
| 11,275,949 B2 | 3/2022 | Chang |
| 2021/0390745 A1 | 12/2021 | Rykhliuk |

OTHER PUBLICATIONS

Garcia-Garcia, et al., A Review on Deep Learning Techniques Applied to Semantic Segmentation, arXiv:1704.06857v1 [cs.CV] Apr. 22, 2017, 2017, pp. 1-23 (Year: 2017).*
Minaee, et al., Image Segmentation Using Deep Learning: A Survey, arXiv:2001.05566v5 [cs.CV] Nov. 15, 2020, 2020, pp. 1-22 (Year: 2020).*

* cited by examiner

*Primary Examiner* — Wilbert L Starks
(74) *Attorney, Agent, or Firm* — Caldwell Intellectual Property Law

(57) ABSTRACT

A video augmentation apparatus is shown. The apparatus may comprise at least a processor and a memory. The processor may be configured to receive a plurality of videos, Additionally, the processor may generate a segment datum as a function of the plurality of videos. The segment datum may be classified to an augmentation datum. The classification may include training an augmentation classifier using a segment training data wherein the segment training data contains a plurality of data entries correlating required segment datum as an input to the augmentation datum as outputs. The classification may further include generating an augmentation classification datum, wherein augmentation classification datum is generated by classifying the segment datum to the augmentation datum using the augmentation classifier. The processor then may generate an augmented video as a function of the augmentation classification datum and display the augmented video using a user display device.

20 Claims, 8 Drawing Sheets

VIDEO AUGMENTATION APPARATUS AND A METHOD FOR ITS USE

CROSS-REFERENCE TO RELATED APPLICATIONS

This application claims the benefit of priority of U.S. Provisional Patent Application Ser. No. 63/180,897, filed on Apr. 28, 2021, and titled "AUTOMATIC REMIXING OF TV AND FILM STREAMING CONTENT WITH CUSTOM VIEWING LENGTHS AND RATINGS," which is incorporated by reference herein in its entirety.

FIELD OF THE INVENTION

The present invention generally relates to the field of digital video. In particular, the present invention is directed to a video augmentation apparatus and a method for its use.

BACKGROUND

Video content (including short-form personal video content) has steadily been gaining in popularity for many years. Its advantages as a communication medium are manifest. However, present ways of doing business, which are commonly reliant upon the written word, are not capable of making optimal use of this form of media.

SUMMARY OF THE DISCLOSURE

In an aspect, a video augmentation apparatus is shown. the video augmentation apparatus may comprise at least a processor and a memory communicatively connected to the processor. The processor may be configured to receive a plurality of videos, Additionally, the processor may generate a segment datum as a function of the plurality of videos. The segment datum may be classified to an augmentation datum. The classification may include training an augmentation classifier using a segment training data wherein the segment training data contains a plurality of data entries correlating required segment datum as an input to the augmentation datum as outputs. The classification may further include generating an augmentation classification datum, wherein augmentation classification datum is generated by classifying the segment datum to the augmentation datum using the augmentation classifier. The processor then may generate an augmented video as a function of the augmentation classification datum. The finally the processor may display the augmented video using a user display device.

In another aspect, a method for video augmentation is shown. The method may comprise receiving, using a processor, a plurality of videos. The method may then generate a segment datum as a function of the plurality of videos, using the processor. A segment datum may be classified to an augmentation datum using the processor. The method may then generate an augmented video as a function of an augmentation classification datum. Finally the method is configured to display the augmented video.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations, and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for A video augmentation apparatus is shown. The apparatus may comprise at least a processor and a memory. The processor may be configured to receive a plurality of videos, Additionally, the processor may generate a segment datum as a function of the plurality of videos. The segment datum may be classified to an augmentation datum. The classification may include training an augmentation classifier using a segment training data wherein the segment training data contains a plurality of data entries correlating required segment datum as an input to the augmentation datum as outputs. The classification may further include generating an augmentation classification datum, wherein augmentation classification datum is generated by classifying the segment datum to the augmentation datum using the augmentation classifier. The processor then may generate an augmented video as a function of the augmentation classification datum and display the augmented video using a user display device. Aspects of the present disclosure allow for F. Exemplary embodiments illustrating aspects of the present disclosure are described below in the context of several specific examples.

Figure 1:
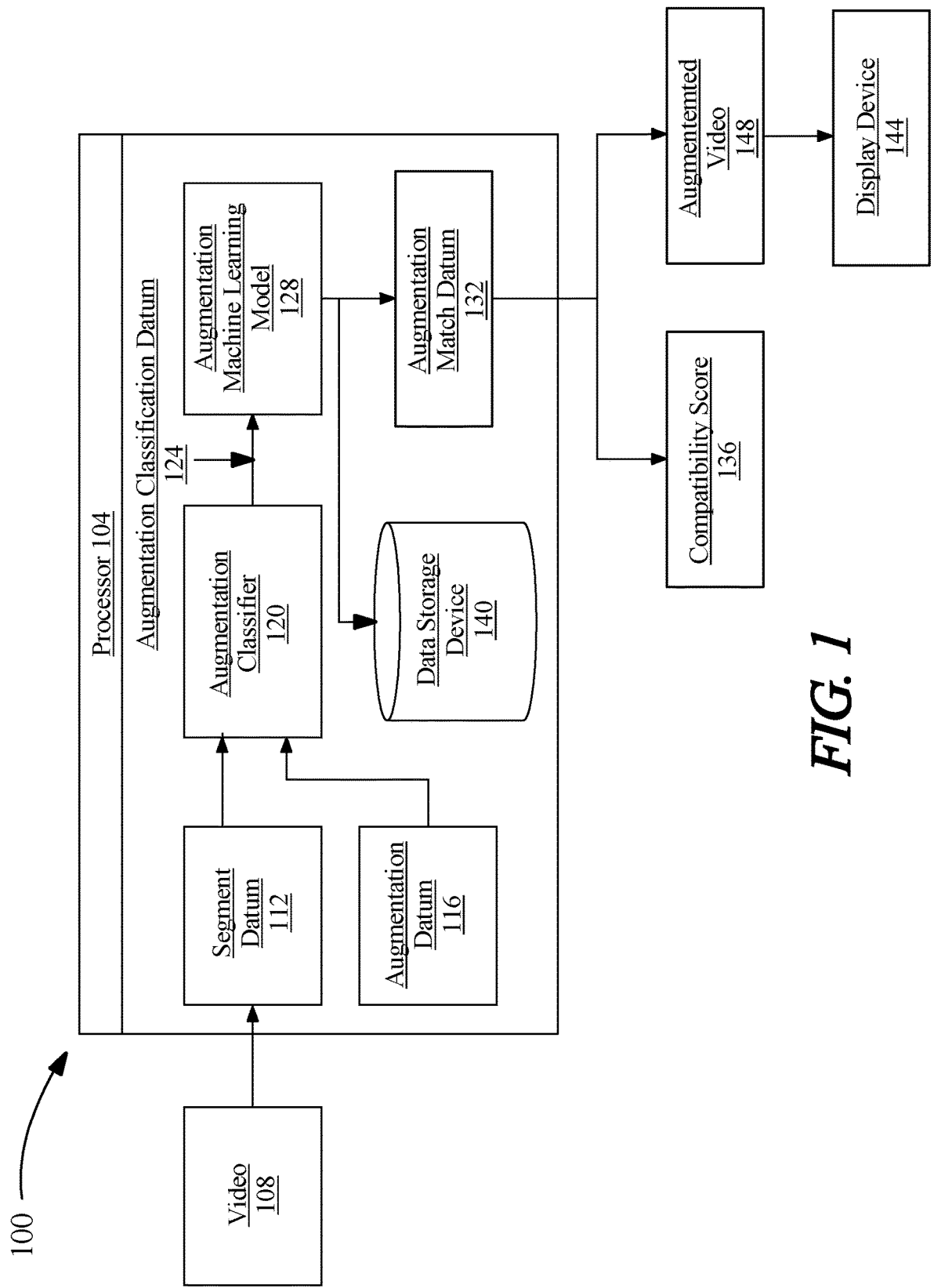
FIG. 1 is a block diagram of an apparatus for a video augmentation apparatus.

Referring now to FIG. 1, an exemplary embodiment of an apparatus 100 for a video augmentation apparatus and a method for its use is illustrated. System includes a processor 104. processor 104 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. processor 104 may include a single computing device operating independently, or may include two or more computing device operating in concert, in parallel, sequentially or the like; two or more computing devices may be included together in a single computing device or in two or more computing devices. processor 104 may interface or communicate with one or more additional devices as described below in further detail via a network interface device. Network interface device may be utilized for connecting processor 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. processor 104 may include but is not limited to, for example, a computing device or cluster of computing devices in a first location and a second computing device or cluster of computing devices in a second location. processor 104 may include one or more computing devices dedicated to data storage, security, distribution of traffic for load balancing, and the like. processor 104 may distribute one or more computing tasks as described below across a plurality of computing devices of computing device, which may operate in parallel, in series, redundantly, or in any other manner used for distribution of tasks or memory between computing devices. processor 104 may be implemented using a "shared nothing" architecture in which data is cached at the worker, in an embodiment, this may enable scalability of system 100 and/or computing device.

With continued reference to FIG. 1, processor 104 may be designed and/or configured to perform any method, method step, or sequence of method steps in any embodiment described in this disclosure, in any order and with any degree of repetition. For instance, processor 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. processor 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, computing device 104 may be configured to receive a video 108. As used in this disclosure, a "video" is an item of media, that includes a recording of moving visual images made digitally or on videotape. A video 108 may be comprised of a plurality of scenes. As used in the current disclosure, a "scene" is a small segment of video 108. A scene may also represent a group of pictures. A Video 108 may include an image component, audio component, and related to a subject. In some cases, video 108 may include a digital video, which may be communicated by way of digital signals, for example between computing devices which are communicatively connected with at least a network. Digital video may be compressed in order to optimize speed and/or cost of transmission of video 108. Videos may be compressed according to a video compression coding format (i.e., codec). Exemplary video compression codecs include without limitation H.26x codecs, MPEG formats, VVC, SVT-AV1, and the like. In some cases, compression of a video 108 may be lossy, in which some information may be lost during compression. Alternatively or additionally, in some cases, compression of a video 108 may be substantially lossless, where substantially no information is lost during compression.

Still referring to FIG. 1, a computing device 104 may be configured to identify a series of frames of video 108. The series of frames may include a group of pictures having some degree of internal similarity, such as a group of pictures representing a scene. In some embodiments, comparing series of frames may include video compression by inter-frame coding. The "inter" part of the term refers to the use of inter frame prediction. This kind of prediction tries to take advantage from temporal redundancy between neighboring frames enabling higher compression rates. Video data compression is the process of encoding information using fewer bits than the original representation. Any compression may be either lossy or lossless. Lossless compression reduces bits by identifying and eliminating statistical redundancy. No information is lost in lossless compression. Lossy compression reduces bits by removing unnecessary or less important information. Typically, a device that performs data compression is referred to as an encoder, and one that performs the reversal of the process (decompression) as a decoder. Data compression may be subject to a space-time complexity trade-off. For instance, a compression scheme for video may require expensive hardware for the video to be decompressed fast enough to be viewed as it is being decompressed, and the option to decompress the video in full before watching it may be inconvenient or require additional storage. Video data may be represented as a series of still image frames. Such data usually contains abundant amounts of spatial and temporal redundancy. Video compression algorithms attempt to reduce redundancy and store information more compactly.

Still referring to FIG. 1, inter-frame coding may function by comparing each frame in the video with another frame, which may include a previous frame. Individual frames of a video sequence may be compared between frames, and a video compression codec may send only the differences from a reference frame for frames other than the reference frame. If a frame contains areas where nothing has moved, a system may issue a short command that copies that part of a reference frame into the instant frame. If sections of a frame move in manner describable through vector mathematics and/or affine transformations, or differences in color, brightness, tone, or the like, an encoder may emit a command that directs a decoder to shift, rotate, lighten, or darken a relevant portion. An encoder may also transmit a residual signal which describes remaining more subtle differences from reference frame, for instance by subtracting a predicted frame generated through vector motion commands from the reference frame pixel by pixel. Using entropy coding, these residual signals may have a more compact representation than a full signal. In areas of video with more motion, compression may encode more data to keep up with a larger number of pixels that are changing. As used in this disclosure, reference frames are frames of a compressed video (a complete picture) that are used to define future frames. As such, they are only used in inter-frame compression techniques. Some modern video encoding standards, such as H.264/AVC, allow the use of multiple reference frames. This may allow a video encoder to choose among more than one previously decoded frame on which to base each macroblock in another frame.

With continued reference to FIG. 1, two frame types used in inter-fame coding may include P-frames and B-frames. A P-frame (Predicted picture) may hold only changes in an image from a reference frame. For example, in a scene where a car moves across a stationary background, only the car's movements may need to be encoded; an encoder does not need to store the unchanging background pixels in the P-frame, thus saving space. A B-frame (Bidirectional predicted picture) may save even more space by using differences between a current frame and both preceding and following frames to specify its content. An inter coded frame may be divided into blocks known as macroblocks. A macroblock may include a processing unit in image and video compression formats based on linear block transforms, such as without limitation a discrete cosine transform (DCT). A macroblock may consist of 16×16 samples, for instance as measured in pixels, and may be further subdivided into transform blocks, and may be further subdivided into prediction blocks. Formats which are based on macroblocks may include JPEG, where they are called MCU blocks, H.261, MPEG-1 Part 2, H.262/MPEG-2 Part 2, H.263, MPEG-4 Part 2, and H.264/MPEG-4 AVC. After an inter coded frame is divided into macroblocks, instead of and/or in addition to directly encoding raw pixel values for each block, an encoder may identify a block similar to the one it is encoding on another frame, referred to as a reference frame. This process may be performed by a block matching algorithm. If an encoder succeeds on its search for a reference frame, a block may be encoded by a vector, known as motion vector, which points to a position of a matching block at the reference frame. A process of motion vector determination may be referred to as motion estimation. Residual values, based on differences between estimated blocks and blocks they are meant to estimate, may be referred to as a prediction error and may be transformed and sent to a decoder.

Still referring to FIG. 1, using a motion vector pointing to a matched block and/or a prediction error a decoder may reconstruct raw pixels of an encoded block without requiring transmission of the full set of pixels. For example, video 108 may be compressed using a P-frame algorithm and broken down into macroblocks. Individual still images taken from video 108 may then be compared against a reference frame taken from another video 108 or augmented video. A P-frame from video 108 may only hold the changes in image from target video 108. For example, if both video 108 include a similar, then what may be encoded and stored may include subtle changes such as an additional character dialogue or character appearances compared to the video without the dialogue. Exemplary video compression codecs may include without limitation H.26x codecs, MPEG formats, VVC, SVT-AV1, and the like. In some cases, compression may be lossy, in which some information may be lost during compression. Alternatively, or additionally, in some cases, compression may be substantially lossless, where substantially no information is lost during compression. In some cases, image component may include a plurality of temporally sequential frames. In some cases, each frame may be encoded (e.g., bitmap or vector-based encoding). Each frame may be configured to be displayed by way of a display. Exemplary displays include without limitation light emitting diode (LED) displays, cathode ray tube (CRT) displays, liquid crystal displays (LCDs), organic LEDs (OLDs), quantum dot displays, projectors (e.g., scanned light projectors), and the like.

Still referring to FIG. 1, Processor 104 may be configured to generate a segment datum 112. As used in the current disclosure, a "segment datum" segmentation of a video. In embodiments a video may be segmented as a function of a subject. Segment datum 112 may include a video 108 that has been segmented by scene. The scene may or may not be included within the original video 108. In other embodiments, a segment datum 112 may be segmented as a function of two or more subjects. Segment datum 112 may be generated as a function of image component, audio component, verbal content, non-verbal content, video 108, and the like. Segment datum 112 may be an entire scene or just a portion of a scene. Segment datum 112 may be marked chronologically. Segment datum 112 may be generated using fuzzy logic or a machine learning model.

In some cases, a segment datum 112 may include content that is based on at least a subject. As used in this disclosure, a "subject" is an element of datum that relates to the content of a scene or a video in relation to the story. Alternatively stated, A subject may be the focus of a particular scene. The subject aspect of a video may include a person, place, or thing that is present in the video 108. In embodiments, subject may include characters, locations, themes associated with a scene.

With continued reference to FIG. 1, segment datum 112 may include at least an image component. As used in this disclosure, an "image component" is a visual component of a video. Image component may include animations, still imagery, recorded video, and the like. Image component may include visual information of video 108. In some cases, image component may include a plurality of sequential frames. In some cases, each frame may be encoded (e.g., bitmap or vector-based encoding). Each frame may be configured to be displayed by way of a display. Exemplary displays include without limitation light emitting diode (LED) displays, cathode ray tube (CRT) displays, liquid crystal displays (LCDs), organic LEDs (OLDs), quantum dot displays, projectors (e.g., scanned light projectors), and the like. In some cases, image component may digitally represent (i.e., encode) visual information, for instance a pixel (luma and/or chroma) mapping.

With continued reference to FIG. 1, segment datum 112 includes at least an audio component. As used in this disclosure, an "audio component" is a representation of audio, for example a sound, a speech, and the like. In some cases, audio component may be represented digitally. In some cases, audio component may be temporally associated with image component video. For example, in some cases, audio component may be synchronized with image component. Audio component may be compressed and/or encoded, for example by way of a digital audio coding format (i.e., codec). Exemplary audio codecs include without limitation free lossless audio codec (FLAC), MPEG-4 audio lossless coding, Dolby digital, MP3, Vorbis, and the like. In some cases, an audio codec may be lossless. Alternatively or additionally, in some cases, an audio codec may be lossy.

With continued reference to FIG. 1, segment datum 112 may include, for example by way of representation with one or both of image component and audio component, verbal content. As used in this disclosure, "verbal content" is comprehensible language-based communication. For example, in some cases, verbal content may include visual verbal content. As used in this disclosure, "visual verbal content" is literal (e.g., written) verbal content. In some cases, visual verbal content may be included within video 108 substantially by way of image component. Alternatively or additionally, in some cases, verbal content may include audible verbal content. As used in this disclosure, "audible verbal content" is oral (e.g., spoken) verbal content. In some cases, audible verbal content may be included within video 108 substantially by way of audio component. In some cases, verbal content may be related to at least an attribute of subject.

Still referring to FIG. 1, in some embodiments, segment datum 112 may include, for example by way of representation with one or both of image component and audio component, non-verbal content. As used in this disclosure, "non-verbal content" is all communication that is not characterized as verbal content. As such, non-verbal content includes all subtle (and non-subtle) forms of communication which are not conveyed with use of language. Exemplary non-verbal content may include change in intonation and/or stress in a speakers voice, expression of emotion, interjection, and the like. For example, in some cases, non-verbal content may include visual non-verbal content. As used in this disclosure, "visual non-verbal content" is non-verbal content that is visually represented. In some cases, visual non-verbal content may be included within video 108 substantially by way of image component. Alternatively or additionally, in some cases, non-verbal content may include audible non-verbal content. As used in this disclosure, "visual non-verbal content" is non-verbal content that is audibly represented. In some cases, audible non-verbal content may be included in video 108 substantially by way of audio component.

Still referring to FIG. 1, Processor 104 may be configured to generate an augmentation datum 116. As used in the current disclosure, a "augmentation datum" is an element of datum by which a video 108 may be changed or altered. In embodiments, a user may choose how the a given video is augmented. Processor 104 may generate augmentation datum as a function of that user's input. Augmentation datum 116 may include altering the video using a rating datum, length datum, character datum, tone datum, location datum, and the like. In a non-limiting example, an augmentation datum 116 may require the removal of all non-age appropriate content from video 108 as a function of rating datum. In another non-limiting example, an augmentation datum 116 may require the addition of all available romance scenes as a function of a tone datum. In a further non-limiting example, augmentation datum 116 may require non-required scenes to be eliminated from video 108 as a function of length datum. Augmentation datum 116 may be used to adjust the content of the video 108. Augmentation datum 116 maybe classified to an applicable segment datum 112. The classification of augmentation datum 116 to a segment datum 112 may prompt the removal or addition of scenes to a given video 108. Augmentation datum 116 may refer to the video as a whole or specific scenes depending on the classification.

Still referring to FIG. 1, augmentation datum 116 may include a rating datum. As used in the current disclosure, "rating datum" is an element of datum relating to a content or maturity rating of video 108. A rating datum may include any content that would change the maturity rating of video 108. Rating datum may include any scenes that include depictions of Violence, profanity, Sexually-derived language, depictions of substance abuse, nudity, sex scenes, and the like. In embodiments, rating datum may be in accordance with the Motion Picture Association (MPA) film rating system, the TV parental guidelines, RIAA, and/or the ESRB. The MPA film rating system has ratings for General (G) Audiences, Parental Guidance (PG) Suggested, Parents Strongly Cautioned (PG-13), Restricted (R), Adults Only (NC-17). Rating datum may also be in accordance with the TV parental guidelines, the TV parental guidelines are as follows TV-Y, TV-Y7, TV-G, TV-PG, TV-14, TV-MA. For example, a scene that contains gory violence may be considered rating datum because that scene contributed to the video's 108 maturity rating being increased. In another non limiting example, a scene that depicts drug use or sex may also be considered rating datum 108. Rating datum may be generated using a machine learning model.

Still referring to FIG. 1, augmentation datum 116 may include a length datum. As used in the current disclosure, "length datum" is datum related to the films length. Length datum may include any scenes that do not further the plot of the video 108. Length datum may include a ranking of scenes from most important to the plot to least important to the plot. This may be done in an effort to eliminate the less important scenes as it relates to the plot with the goal of generating a shorter video. Length datum may also include the beginning and the end credits of a video 108 which may be eliminated. Length datum may be generated using a machine learning model.

Still referring to FIG. 1, augmentation datum 116 may include a character datum. As used in the current disclosure, "character datum" is an element of datum related to character that is present within a scene. In an embodiment, character datum may be scenes where a character is identifiable within video 108. In embodiments, character datum may include both main characters and side characters alike. Character datum may also include any actor or voice actors identified within a given scene. Character datum may include humans, animated characters, fictional characters, computer generated characters, animals, and the like. Character datum may be generated using facial recognition software or voice recognizing software. As used in the current disclosure, "facial recognition software" a technology capable of matching a human face from a digital image or a video frame against a database of faces, typically employed to authenticate users through ID verification services, works by pinpointing and measuring facial features from a given image. Computerized facial recognition involves the measurement of a character's physiological characteristics, facial recognition systems are categorized as biometrics.

Still referring to FIG. 1, augmentation datum 116 may include a tone datum. As used in the current disclosure, "Tone datum" is a tone of a given scene. A tone may be conveyed by the context of a scene or by the activity that is occurring in the scene. Tone datum may include action scenes, dramatic scenes, fight scenes, love scenes, emotional scenes, car scenes, dream scenes, sex scenes, music scene, fantasy scene, comedic scenes, and the like. Tone datum may be generated using a machine learning model. Tone datum may include a location of a given scene or character either real or fictional. For example, a tone datum may include scenes that were set at Niagara Falls. Tone datum may also include various arcs, scenes, sub-plots, plots, and storylines within a video 108. This may include any journeys, missions, objectives, goals, a character may take part in throughout a given video.

Still referring to FIG. 1, processor 104 may classify segment datum 112 to an augmentation datum 116. Segment datum 112 may be classified to augmentation datum 116 as a function of rating datum, length datum, character datum, tone datum, location datum. For example, Segment datum 112 may be classified based any one or combination of subject, image component, audio component, verbal content, non-verbal content, video 108. In another non limiting example, Segment datum 112 may be classified based on matching augmentation datum 116 to an image component, audio component, verbal content, non-verbal content of video 108. Augmentation datum 116 may be used to classify video 108 or scenes based on rating datum, length datum, character datum, tone datum, location datum. Video 108 may also be classified based on the absence or presence of any Augmentation datum 116. For an example, Segment datum 112 may be classified as a function of a tone datum or rating datum. Segment datum 112 may also be classified as a function of a user input. As used in the current disclosure, an "user input" is an element of datum that is added by the user. In an embodiment, a user input may include an augmentation datum that an users wants incorporated into video 108.

With continued reference to FIG. 1, Processor 104 may be configured to classify segment datum 112 using an augmentation classifier machine learning model 144. Whereas inputs to the to the machine learning model may include augmentation datum 116, segment datum 112, video 108. The output to the classifier may be augmentation classification datum 124. Classification training data is a plurality of data entries containing a plurality of inputs that are correlated to a plurality of outputs for training a processor by a machine-learning process to align and classify attributes. Augmentation training data may contain information about the augmentation datum 116, segment datum 112, video 108, image component, audio component, verbal content, non-verbal content, rating datum, length datum, character datum, tone datum, location datum, and the like. Classification training data may include any augmentation match datum 132 stored in a database, remote data storage device, or a user input or device. Augmentation training data may be generated from any past or present augmentation datum 116, segment datum 112, video 108. Classification training data may be configured to correlate segment datum 112 to an augmentation datum 116. In other embodiments, classification training data may be configured to correlate augmentation datum 116 to segment datum 112. Processor 104 may include augmentation classifier using a classification algorithm, defined as a processes whereby a processor 104 derives, from training data, a model known as a "classifier" for sorting inputs into categories or bins of data. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

With continued reference to FIG. 1, machine learning model 144 may be configured to classify a group of pictures or a scene to a segment datum. In embodiment a group of pictures may be classified to a segment datum as a function of the subject scene, A group of pictures may be classified to a segment datum based on the content of the scene also. Also, a group of picture may be classified to a augmentation datum 116. A group of pictures may be classified to an augmentation datum as a function of the absence or presence of a character datum, tone datum, location datum, rating datum, and the like. In a non-limiting example, a group of pictures may be classified to an augmentation datum, specifically a rating datum, as a function of the presence of nudity within the group of pictures. In another example, a group of pictures may be classified to an augmentation datum, specifically a tone datum, as a function of the journey, mission, or arc within a given story or video 108. A group of pictures may also be classified to a augmentation classification datum 124. A group of pictures may be classified to an augmentation classification datum 124 to include or remove content as function of a user request or augmentation datum. Additionally, a group of pictures may be used to construct or classify a augmented video 148. A group of pictures may be used to establish the chronology or story line of a augmented video 148

With continued reference to FIG. 1, Processor 104 may be configured to generate augmentation classification datum 124. As used in the current disclosure, "augmentation classification datum" is a manner of grouping, matching, or sorting segment datum 112 as a function of augmentation datum 116. Segment datum 112 may be classified based on any combination of augmentation datum 116 described herein above. In a non-limiting example, an augmentation classification datum may pair a tone datum to a segment datum 112. In another non-limiting example, augmentation classification datum 124 may be the pairing of a length datum to a segment datum 112

Still referring to FIG. 1, processor 104 may store augmentation classification datum 124 in an augmentation database. In an embodiment, "augmentation database" may include any data structure for ordered storage and retrieval of data, which may be implemented as a hardware or software module. classification database may be implemented, without limitation, as a relational database, a key-value retrieval datastore such as a NOSQL database, or any other format or structure for use as a datastore that a person skilled in the art would recognize as suitable upon review of the entirety of this disclosure. Data entries in a classification database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a classification database may reflect categories, cohorts, and/or populations of data consistently with this disclosure.

With continued reference to FIG. 1, machine-learning processes may include classification algorithms, defined as processes whereby a processor 104 derives, from training data, a model for sorting inputs into categories or bins of data. Classification may be performed using, without limitation, linear classifiers such as without limitation logistic regression and/or naive Bayes classifiers, nearest neighbor classifiers including without limitation k-nearest neighbors classifiers, support vector machines, decision trees, boosted trees, random forest classifiers, and/or neural network-based classifiers, fuzzy logic.

Still referring to FIG. 1, processor 104 may be configured to generate augmentation classifier 120 using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as P(A/B)=P(B/A)P(A)÷P(B), where P(AB) is the probability of hypothesis A given data B also known as posterior probability; P(B/A) is the probability of data B given that the hypothesis A was true; P(A) is the probability of hypothesis A being true regardless of data also known as prior probability of A; and P(B) is the probability of the data regardless of the hypothesis. A naïve Bayes algorithm may be generated by first transforming training data into a frequency table. Processor 104 may then calculate a likelihood table by calculating probabilities of different data entries and classification labels. Processor 104 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 1, processor 104 may be configured to generate augmentation classifier 120 using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 1, processor 104 classifier may be implemented as a fuzzy inferencing system. As used in the current disclosure, a "Fuzzy inference" is a method that interprets the values in the input vector (i.e., segment datum 112 and augmentation datum 116) and, based on a set of rules, assigns values to the output vector. A set of Fuzzy rules may include a collection of linguistic statements that describe how the system should make a decision regarding classifying an input or controlling an output. While using fuzzy logic, the truth of any statement may become a matter of a degree. A Fuzzy inference may include the process of mapping from a given input to an output using fuzzy logic. The mapping may then then provide a basis from which decisions can be made or patterns discerned. The process of fuzzy inference may involve functions, fuzzy logic operators, and if-then rules, etc. The system may be applied using two types of fuzzy inference systems: Mamdani-type and Sugeno-type. These two types of inference systems vary somewhat in the way outputs are determined.

With continued reference to FIG. 1, processor 104 may be configured to generate augmentation match datum 132. As used in the current disclosure, "augmentation match datum" is an element of datum that demonstrates how well a scene is suited to match the augmentation requirements of an augmentation datum 116. In an embodiment, augmentation match datum 132 may be a calculation of how well a video's segment datum 112 is paired to an augmentation datum 116. Augmentation match datum 132 may reflected as a percentage or an augmentation compatibility score 136.

With continued reference to FIG. 1, processor 104 may be configured to generate augmentation match datum 132 using a as a function of augmentation classification datum. Whereas inputs to the to the machine learning model 128 may include augmentation datum 116, segment datum 112, video 108, augmentation classification datum 124. The output to the machine learning model 128 is augmentation match datum 132. Machine learning model 128 correlates a plurality of data entries containing a plurality of inputs to a plurality of outputs for training a processor by a machine-learning process 128 to align Augmentation datum 116 to segment datum 112. Machine learning model may be trained using an augmentation training data.

In one or more embodiments, processor 104 may implement a compatibility algorithm or a machine-learning module, such as augmentation machine-learning module 128, to determine an augmentation compatibility score 136 between segment datum 112 and augmentation datum 116. For the purposes of this disclosure, a "augmentation compatibility score" is a measurable value representing a relevancy of a of an augmentation datum 116 to a segment datum 112. In one or more non-limiting embodiments, augmentation compatibility score 136 may be a quantitative characteristic, such as a numerical value within a set range. For example, an augmentation compatibility score may be a "2" for a set range of 1-10, where "1" represents an augmentation datum 116 to a segment datum 112 having a minimum compatibility and "10" represents augmentation datum 116 to a segment datum 112 having a maximum compatibility. In other non-limiting embodiments, augmentation compatibility score 136 may be a quality characteristic, such as a color coding, where each color is associated with a level of compatibility. In one or more embodiments, if an augmentation compatibility score 136 is "low", then augmentation datum 116 to a segment datum 112 are considered to have a minimum compatibility; if an augmentation compatibility score 136 is "high", then augmentation datum 116 to a segment datum 112 are considered to have a maximum compatibility. Compatibility score 136 may represent how well a given scene from a video fits within an augmentation datum 116. A scene may be incorporated into the augmented video 148 as a function of the compatibility 136.

For the purposes of this disclosure, a "compatibility algorithm" is an algorithm that determines the relevancy of an augmentation datum 116 to a segment datum 112. If multiple scenes have a given criteria set out by an augmentation datum 116, then the compatibility scores between each scenes augmentation datum 116 to a segment datum 112 may be ranked or chronologically ranked so that the processor may determine how to reconstruct a video. In an embodiment, a compatibility algorithm may be configured to optimize input datum to find a segment datum 112 is the best fit to an augmentation datum 116. Compatibility algorithm may include machine-learning processes that are used to calculate a set of compatibility scores. Machine-learning process may be trained by using training data associated with past calculations and/or information for the segment datum 112 and augmentation datum 116, such as data related to past prior compatibility scores, past and present augmentation datum 116, segment datum 112, or any other training data described in this disclosure. augmentation compatibility score 136 may be determined by, for example, if a certain numerical value of augmentation data 116 matches segment data 112, where the more an augmentation datum matches the segment datum, the higher the score and the greater the compatibility between the augmentation datum and the segment datum. For example, and without limitation, a user may enter an augmentation datum that requests an extremely graphic video 108 to become suitable for all audiences, the compatibility between the augmentation data 116 and segment data 112 may be low because once the graphic content is removed the video 108 is unrecognizable.

In one or more embodiments, a machine-learning process may be used to determine compatibility algorithm or to generate a machine-learning model that may directly calculate augmentation compatibility score 136 or augmentation match datum 132. In one or more embodiments, a machine-learning model may be generated using training data. Training data may include inputs and corresponding predetermined outputs so that a machine-learning module may use the correlations between the provided exemplary inputs and outputs to develop an algorithm and/or relationship that then allows the machine-learning module to determine its own outputs for inputs. Training data may contain correlations that a machine-learning process may use to model relationships between two or more categories of data elements. The exemplary inputs and outputs may come from a database, such as any database described in this disclosure, or be provided by a user. In other embodiments, a machine-learning module may obtain a training set by querying a communicatively connected database that includes past inputs and outputs. Training data may include inputs from various types of databases, resources, and/or user inputs and outputs correlated to each of those inputs so that a machine-learning module may determine an output. Correlations may indicate causative and/or predictive links between data, which may be modeled as relationships, such as mathematical relationships, by machine-learning processes, as described in further detail below. In one or more embodiments, training data may be formatted and/or organized by categories of data elements by, for example, associating data elements with one or more descriptors corresponding to categories of data elements. As a non-limiting example, training data may include data entered in standardized forms by persons or processes, such that entry of a given data element in a given field in a form may be mapped to one or more descriptors of categories. Elements in training data may be linked to descriptors of categories by tags, tokens, or other data elements.

Still referring to FIG. 1, processor 104 may compute a score associated with augmentation match datum 132 and/or augmentation compatibility score 136. augmentation match datum 132 may be configured to minimize and/or maximize the score, depending on whether an optimal result is represented, respectively, by a minimal and/or maximal score; a mathematical function, described herein as an "objective function," may be used by processor 104 to score each possible pairing. Objective function may be based on one or more objectives as described below. Processor 104 may pair a predicted route, with a given courier, which optimizes an objective function. In various embodiments a score of a particular augmentation match datum 132 may be based on a combination of one or more factors, including augmentation classification datum 124, segment datum 112, augmentation datum 116, or their respective component parts. Each factor may be assigned a score based on predetermined variables. In some embodiments, the assigned scores may be weighted or unweighted.

Optimization of objective function may include performing a greedy algorithm process. A "greedy algorithm" is defined as an algorithm that selects locally optimal choices, which may or may not generate a globally optimal solution. For instance, processor 104 may select augmentation classification datum 124 or segment datum 112, augmentation datum 116 so that scores associated therewith are the best score for each element of datum and/or for each courier. In such an example, optimization may determine the combination of routes such that each delivery pairing includes the highest score possible.

Still referring to FIG. 1, objective function may be formulated as a linear objective function, which processor 104 may solve using a linear program such as without limitation a mixed-integer program. A "linear program," as used in this disclosure, is a program that optimizes a linear objective function, given at least a constraint. In various embodiments, apparatus 100 may determine augmentation match datum 132 that maximizes a total score subject to a constraint that may include segment datum 112, augmentation datum 116, and video 108. A mathematical solver may be implemented to solve for t augmentation match datum 132 that maximizes scores; mathematical solver may be implemented on processor 104 and/or another device in apparatus 100, and/or may be implemented on third-party solver.

With continued reference to FIG. 1, optimizing objective function may include minimizing a loss function, where a "loss function" is an expression an output of which an optimization algorithm minimizes to generate an optimal result. As a non-limiting example, processor 104 may assign variables relating to a set of parameters, which may correspond to score components as described above, calculate an output of mathematical expression using the variables, and select augmentation classification datum 124, credential datum 112, and required credential datum 120 that produces an output having the lowest size, according to a given definition of "size," of the set of outputs representing each of plurality of combinations; size may, for instance, included absolute value, numerical size, or the like. Selection of different loss functions may result in identification of different potential pairings as generating minimal outputs.

In one or more embodiments, apparatus 100 may further include a Data storage device 140. Data storage device 140 may be communicatively connected to processor 104 and may be configured to store information and/or datum related to apparatus 100, such segment datum 112, augmentation datum 116, information related to augmentation classification datum 124, augmentation match datum 132, compatibility score 136, augmentation datum 116, segment datum 112, and the like. In one or more embodiments, Data storage device 140 is communicatively connected to a processor and configured to contain instructions configuring processor to determine the record recommendation. Data storage device 140 may be configured to store information and datum related to posting match recommendation. For example, Data storage device 140 may store previously prepared records (e.g., augmented videos), records generated by processor 104, augmentation datum 116, segment datum 112, augmentation match datum 132, classification datum, and the like. In one or more embodiments, memory component may include a storage device, as described further in this disclosure below.

With continued reference to FIG. 1, a "display device," for the purpose of this disclosure, is any device, such as a mobile device, laptop, desktop computer, or the like used to display video. In a non-limiting embodiment, display device 144 may be a computer and/or smart phone operated by a user in a remote location. Display device 144 may include, without limitation, a display in communication with processor 104; the display may include any display as described in the entirety of this disclosure such as a light emitting diode (LED) screen, liquid crystal display (LCD), organic LED, cathode ray tube (CRT), touch screen, or any combination thereof. In a non-limiting embodiment, display device 144 may include a graphical user interface configured to display any augmented video 148 from processor 104 and/or any computing device. In a non-limiting embodiment, a user may utilize display device 144 to view a plurality of information regarding segment datum 112, augmentation datum 116, augmentation compatibility score 136, augmentation match datum 132, video 108.

With continued reference to FIG. 1, an augmentation classification datum 124 may be used to generate an augmented video 148. As used in the current disclosure, "augmented video" is a video 108 that been altered as a function of augmentation classification datum 124. Augmented video 148 may be a video that incorporates more or less of a given augmentation datum 116. This may include more or less of a rating datum, length datum, character datum, tone datum, location datum, and the like. An augmented video 148 may be generated as a function of augmentation match datum 132, compatibility score 136, and/or augmentation classification datum 124. The augmentation classification datum 124 may be added or subtracted from a video 108 to produce augmented video 148. The augmentation classification datum 124 may be added or removed augmented video 148 in a manner that provides the most coherent story. For example, augmented video 148 may include a story line focused around Character A. This augmented video 148 may be generated as by adding an augmentation classification datum 124 which has classified character datum focused around Character A to a segment datum 112 where character A was present. In another example, augmented video 148 may include content that is rated PG 13 when the original story was rated NC-17. This augmented video 148 may be generated by removing augmentation classification datum 124 which has classified has a rating datum to segment datum 112 that contains content that may be inappropriate for younger viewer. In a further example, augmented video 148 may include a story line that is focused around fight scenes. This augmented video 148 may be generated by the addition of an augmentation classification datum 124 which has classified a tone datum to segment datum 112 includes fight scenes. One who is reasonably skilled in the art would understand the multitude of ways augmented video 148 may be generated as a function of an augmentation classification datum 124.

Figure 2:
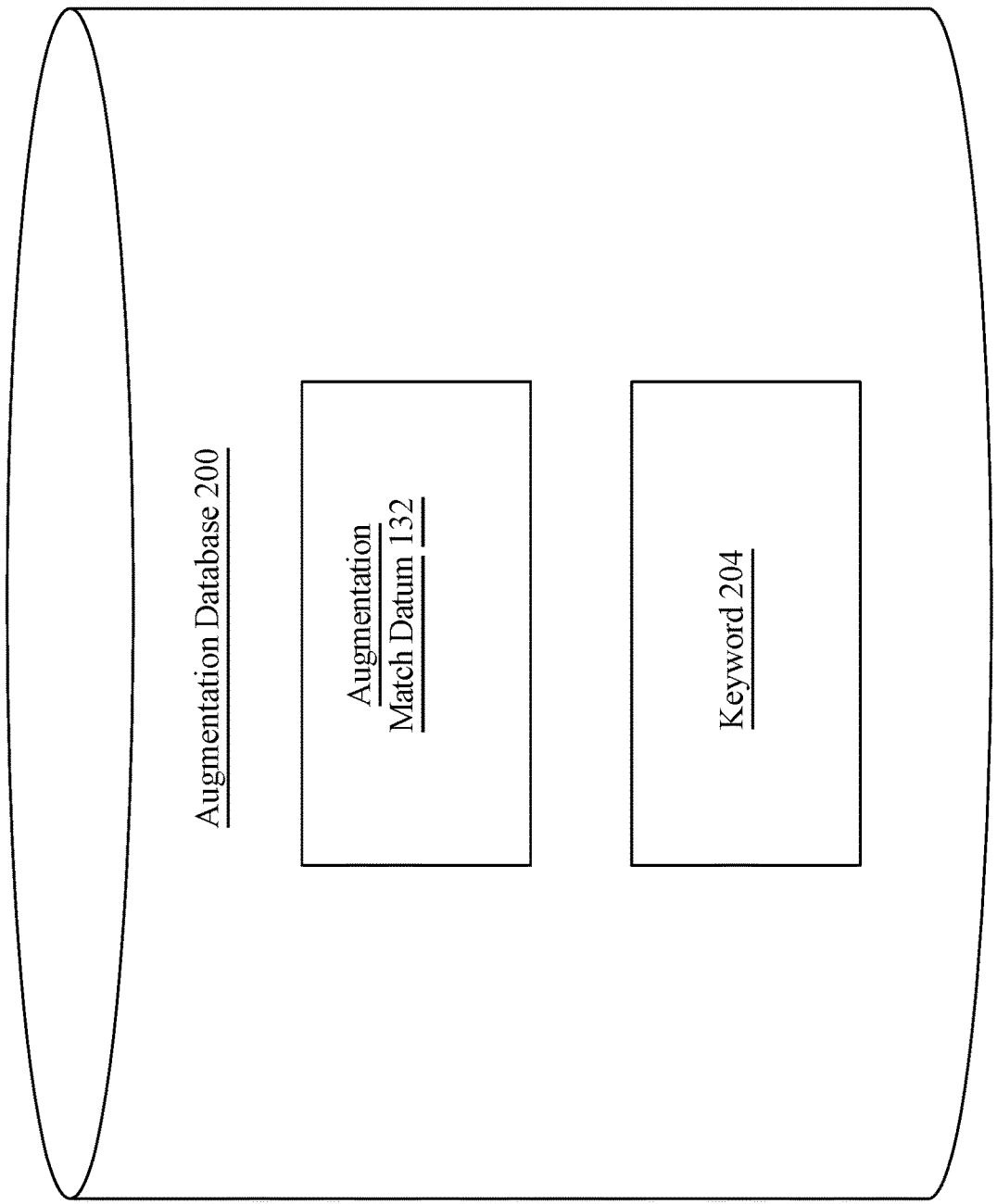
FIG. 2 is a diagrammatic representation of an augmentation database.

Now referring to FIG. 2, an exemplary augmentation database 200 is illustrated by way of block diagram. Past or present augmentation match datum 132 may be stored in an augmentation database 200 (also referred to as "database"). Processor 104 may be communicatively connected with augmentation database 200. For example, in some cases, database 200 may be local to processor 104. Alternatively or additionally, in some cases, database 200 may be remote to processor 104 and communicative with processor 104 by way of one or more networks. Network may include, but not limited to, a cloud network, a mesh network, or the like. By way of example, a "cloud-based" system, as that term is used herein, can refer to a system which includes software and/or data which is stored, managed, and/or processed on a network of remote servers hosted in the "cloud," e.g., via the Internet, rather than on local severs or personal computers. A "mesh network" as used in this disclosure is a local network topology in which the infrastructure processor 104 connect directly, dynamically, and non-hierarchically to as many other computing devices as possible. A "network topology" as used in this disclosure is an arrangement of elements of a communication network. Network may use an immutable sequential listing to securely store database 200. Additionally or alternatively, each augmented video 148, metrics thereof, etc. may be stored in an immutable sequential listing. An "immutable sequential listing," as used in this disclosure, is a data structure that places data entries in a fixed sequential arrangement, such as a temporal sequence of entries and/or blocks thereof, where the sequential arrangement, once established, cannot be altered, or reordered. An immutable sequential listing may be, include and/or implement an immutable ledger, where data entries that have been posted to the immutable sequential listing cannot be altered.

Continuing to reference FIG. 2, database 200 may store a plurality of past candidate match datum 204. augmentation match datum 132 may be generated using the augmentation database 200. As used in this disclosure, "augmentation database" is a data structure configured to store data associated with a plurality of augmentation match datum 132 and augmentation compatibility score 136. Database 200 may comprise of augmentation match datum 132 from the same employer or from connected employers. Database 200 may comprise of all augmented videos 148 from a generated by processor 104. Augmentation match datum 132 and augmentation compatibility score 136 may be uploaded to augmentation database from at least a remote device. A "remote device," as used in this disclosure, is a computing device, including but not limited to a mobile device such as a smartphone, tablet, laptop, desktop, and the like. augmentation database 200 may comprise of augmentation match datum 132 in their entirety or of candidate acceptance keyword 208. As used in this disclosure, a "keyword" is any meaningful word or syntax. For example without limitation, a keyword 208 may be "action scene" in the instance that an augmentation datum 116 is requesting addition action scenes. In another nonlimiting example, a keyword 204 may be "Chris" in an example where a character's name within a video 108 is Chris. Database 200 may be implemented, without limitation, as a relational database, a key-value retrieval datastore such as a NOSQL database, or any other format or structure for use as a datastore that a person skilled in the art would recognize as suitable upon review of the entirety of this disclosure.

Figure 3:
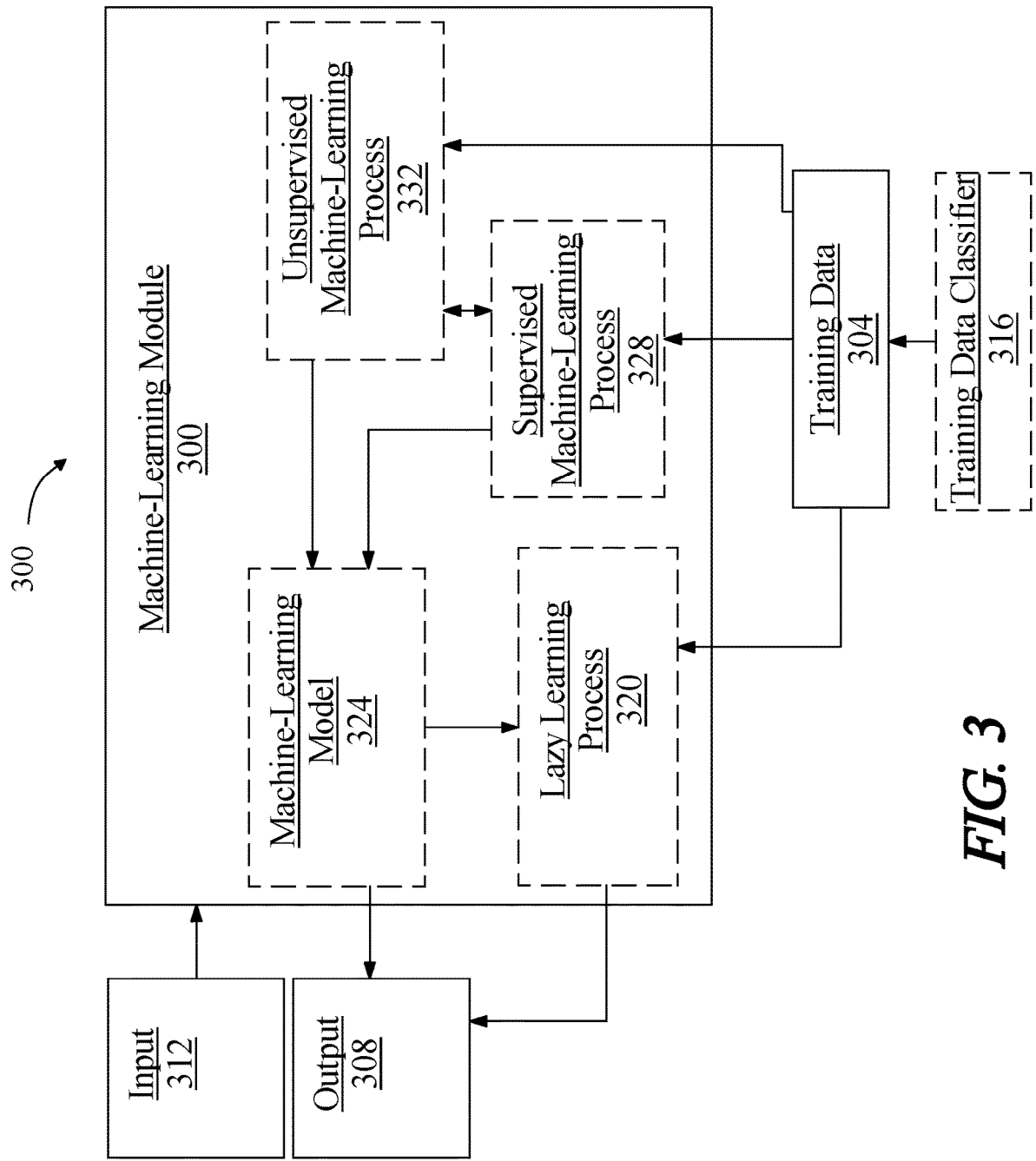
FIG. 3 is a block diagram of exemplary machine-learning processes.

Referring now to FIG. 3, an exemplary embodiment of a machine-learning module 300 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 304 to generate an algorithm that will be performed by a computing device/module to produce outputs 308 given data provided as inputs 312; this is in contrast to a non-machine learning software program where the commands to be executed are determined in advance by a user and written in a programming language.

Still referring to FIG. 3, "training data," as used herein, is data containing correlations that a machine-learning process may use to model relationships between two or more categories of data elements. For instance, and without limitation, training data 304 may include a plurality of data entries, each entry representing a set of data elements that were recorded, received, and/or generated together; data elements may be correlated by shared existence in a given data entry, by proximity in a given data entry, or the like. Multiple data entries in training data 304 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 304 according to various correlations; correlations may indicate causative and/or predictive links between categories of data elements, which may be modeled as relationships such as mathematical relationships by machine-learning processes as described in further detail below. Training data 304 may be formatted and/or organized by categories of data elements, for instance by associating data elements with one or more descriptors corresponding to categories of data elements. As a non-limiting example, training data 304 may include data entered in standardized forms by persons or processes, such that entry of a given data element in a given field in a form may be mapped to one or more descriptors of categories. Elements in training data 304 may be linked to descriptors of categories by tags, tokens, or other data elements; for instance, and without limitation, training data 304 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 3, training data 304 may include one or more elements that are not categorized; that is, training data 304 may not be formatted or contain descriptors for some elements of data. Machine-learning algorithms and/or other processes may sort training data 304 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 304 to be made applicable for two or more distinct machine-learning algorithms as described in further detail below.

Training data 304 used by machine-learning module 300 may correlate any input data as described in this disclosure to any output data as described in this disclosure. As a non-limiting illustrative example input data may include augmentation data tables and output data may include matching opportunity postings.

Further referring to FIG. 3, training data may be filtered, sorted, and/or selected using one or more supervised and/or unsupervised machine-learning processes and/or models as described in further detail below; such models may include without limitation a training data classifier 316. Training data classifier 316 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 300 may generate a classifier using a classification algorithm, defined as a processes whereby a computing device and/or any module and/or component operating thereon derives a classifier from training data 304. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 316 may classify elements of training data to categories of opportunity postings.

Still referring to FIG. 3, machine-learning module 300 may be configured to perform a lazy-learning process 320 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 304. Heuristic may include selecting some number of highest-ranking associations and/or training data 304 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 3, machine-learning processes as described in this disclosure may be used to generate machine-learning models 324. A "machine-learning model," as used in this disclosure, is a mathematical and/or algorithmic representation of a relationship between inputs and outputs, as generated using any machine-learning process including without limitation any process as described above and stored in memory; an input is submitted to a machine-learning model 324 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 324 may be generated by creating an artificial neural network, such as a convolutional neural network comprising an input layer of nodes, one or more intermediate layers, and an output layer of nodes. Connections between nodes may be created via the process of "training" the network, in which elements from a training data 304 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 3, machine-learning algorithms may include at least a supervised machine-learning process 328. At least a supervised machine-learning process 328, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include attribute data tables as described above as inputs, matching opportunity postings as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 304. Persons skilled in the art, upon reviewing the entirety of this disclosure, will be aware of various possible variations of at least a supervised machine-learning process 328 that may be used to determine relation between inputs and outputs. Supervised machine-learning processes may include classification algorithms as defined above.

Further referring to FIG. 3, machine learning processes may include at least an unsupervised machine-learning processes 332. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 3, machine-learning module 300 may be designed and configured to create a machine-learning model 324 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 3, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Figure 4:
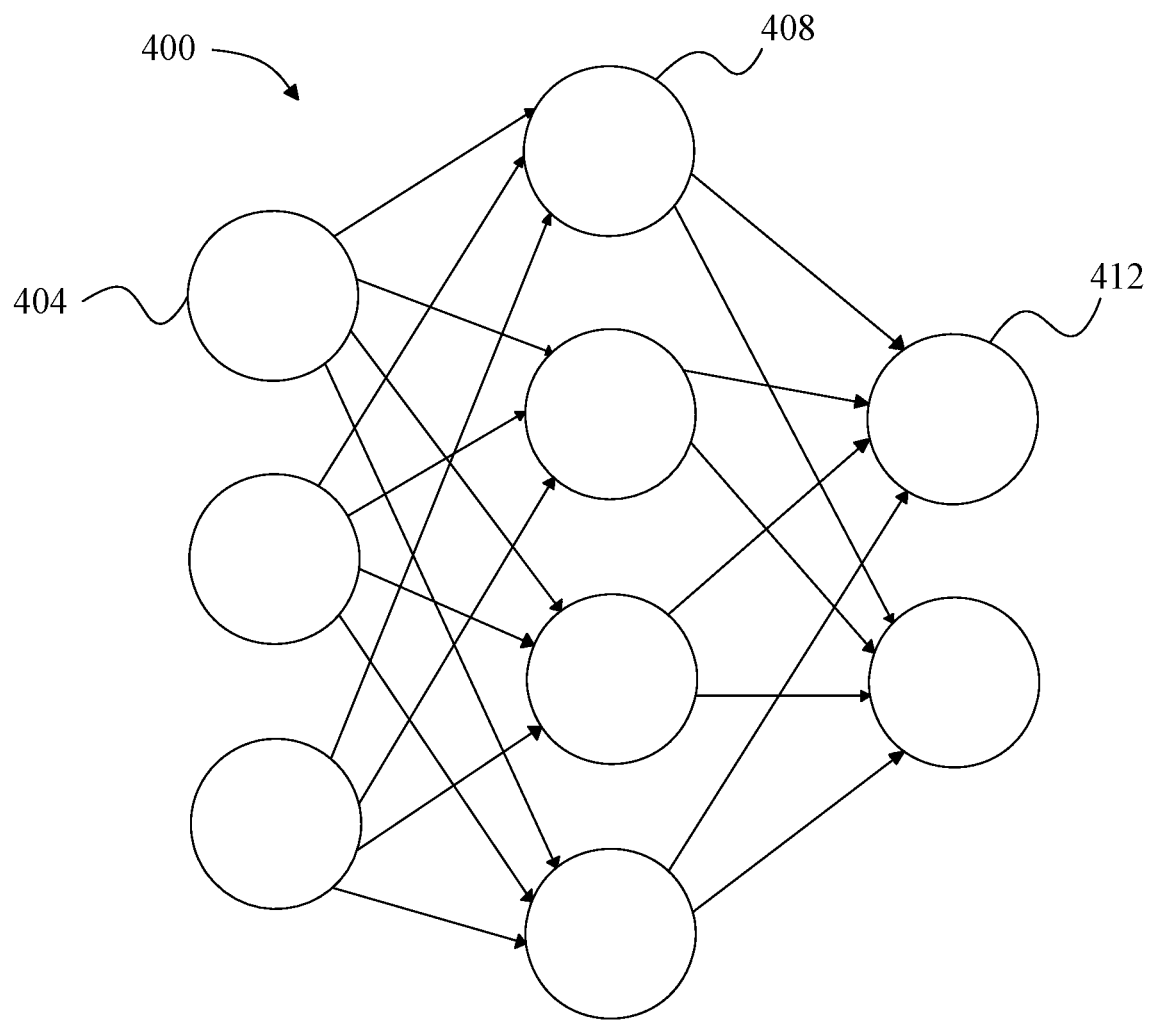
FIG. 4 illustrates an exemplary neural network.

Referring now to FIG. 4, an exemplary embodiment of neural network 400 is illustrated. A neural network 400 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network."

Figure 5:
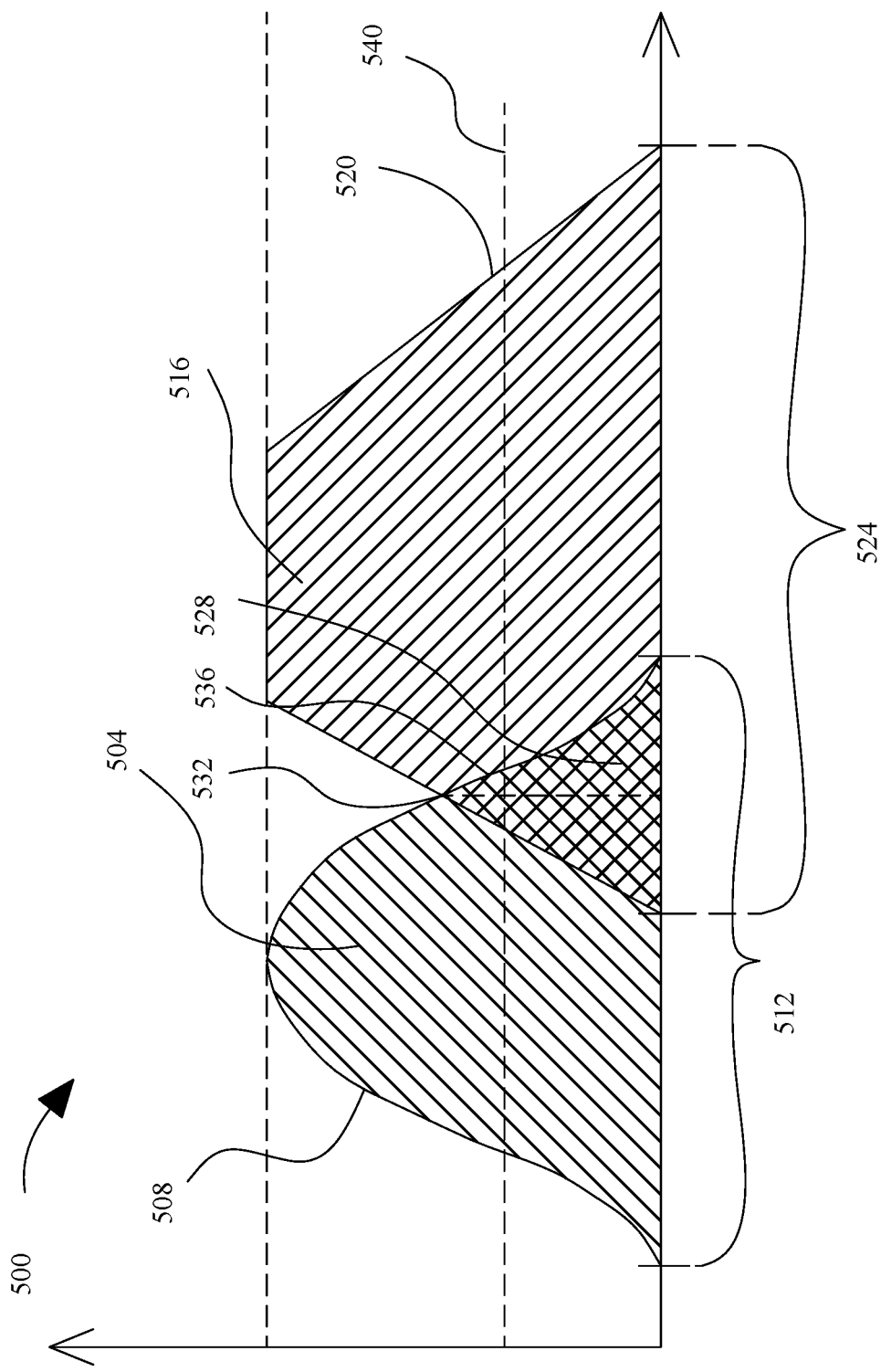
FIG. 5 is a graph illustrating an exemplary relationship between fuzzy sets.

Now referring to FIG. 5, an exemplary embodiment of fuzzy set comparison 500 is illustrated. In a non-limiting embodiment, the fuzzy set comparison. In a non-limiting embodiment, fuzzy set comparison 500 may be consistent with comparison in FIG. 1. In another non-limiting the fuzzy set comparison 500 may be consistent with the name/version matching as described herein. For example and without limitation, the parameters, weights, and/or coefficients of the membership functions may be tuned using any machine-learning methods for the name/version matching as described herein. In another non-limiting embodiment, the fuzzy set may represent compatibility score 136 and its ranges from FIG. 1.

Alternatively or additionally, and still referring to FIG. 5, fuzzy set comparison 500 may be generated as a function of determining data compatibility threshold. The compatibility threshold may be determined by a computing device. In some embodiments, a computing device may use a logic comparison program, such as, but not limited to, a fuzzy logic model to determine the compatibility threshold and/or version authenticator. Each such compatibility threshold may be represented as a value for a posting variable representing the compatibility threshold, or in other words a fuzzy set as described above that corresponds to a degree of compatibility and/or allowability as calculated using any statistical, machine-learning, or other method that may occur to a person skilled in the art upon reviewing the entirety of this disclosure. In some embodiments, determining the compatibility threshold and/or version authenticator may include using a linear regression model. A linear regression model may include a machine learning model. A linear regression model may map statistics such as, but not limited to, frequency of the same range of version numbers, and the like, to the compatibility threshold and/or version authenticator. In some embodiments, determining the compatibility threshold of any posting may include using a classification model. A classification model may be configured to input collected data and cluster data to a centroid based on, but not limited to, frequency of appearance of the range of versioning numbers, linguistic indicators of compatibility and/or allowability, and the like. Centroids may include scores assigned to them such that the compatibility threshold may each be assigned a score. In some embodiments, a classification model may include a K-means clustering model. In some embodiments, a classification model may include a particle swarm optimization model. In some embodiments, determining a compatibility threshold may include using a fuzzy inference engine. A fuzzy inference engine may be configured to map one or more compatibility threshold using fuzzy logic. In some embodiments, a plurality of computing devices may be arranged by a logic comparison program into compatibility arrangements. A "compatibility arrangement" as used in this disclosure is any grouping of objects and/or data based on skill level and/or output score. Membership function coefficients and/or constants as described above may be tuned according to classification and/or clustering algorithms. For instance, and without limitation, a clustering algorithm may determine a Gaussian or other distribution of questions about a centroid corresponding to a given compatibility threshold and/or version authenticator, and an iterative or other method may be used to find a membership function, for any membership function type as described above, that minimizes an average error from the statistically determined distribution, such that, for instance, a triangular or Gaussian membership function about a centroid representing a center of the distribution that most closely matches the distribution. Error functions to be minimized, and/or methods of minimization, may be performed without limitation according to any error function and/or error function minimization process and/or method as described in this disclosure.

Still referring to FIG. 5, inference engine may be implemented according to input and/or output match datum 132. For instance, an acceptance variable may represent a first measurable value pertaining to the classification of segment datum 112 to augmentation datum 116 such as the amount of content a given video 108 has of a suggested augmentation. Continuing the example, an output variable may represent the augmentation compatibility score 136 or an augmentation match datum 132. In an embodiment, an augmentation compatibility score 136 or an augmentation match datum 132 may be represented by its own fuzzy set. In other embodiments, an augmentation compatibility score 136 or an augmentation match datum 132 may be represented by the function of the intersection two fuzzy sets as shown in FIG. 5, An inference engine may combine rules, such as any semantic versioning, semantic language, version ranges, and the like thereof. The degree to which a given input function membership matches a given rule may be determined by a triangular norm or "T-norm" of the rule or output function with the input function, such as min (a, b), product of a and b, drastic product of a and b, Hamacher product of a and b, or the like, satisfying the rules of commutativity (T(a, b)=T(b, a)), monotonicity: (T(a, b)≤T(c, d) if a≤c and b≤d), (associativity: T(a, T(b, c))=T(T(a, b), c)), and the requirement that the number 1 acts as an identity element. Combinations of rules ("and" or "or" combination of rule membership determinations) may be performed using any T-conorm, as represented by an inverted T symbol or "⊥," such as max(a, b), probabilistic sum of a and b (a+b−a*b), bounded sum, and/or drastic T-conorm; any T-conorm may be used that satisfies the properties of commutativity: ⊥(a, b)=⊥(b, a), monotonicity: ⊥(a, b)≤⊥(c, d) if a≤c and b≤d, associativity: ⊥(a, ⊥(b, c))=⊥(⊥(a, b), c), and identity element of 0. Alternatively or additionally T-conorm may be approximated by sum, as in a "product-sum" inference engine in which T-norm is product and T-conorm is sum. A final output score or other fuzzy inference output may be determined from an output membership function as described above using any suitable defuzzification process, including without limitation Mean of Max defuzzification, Centroid of Area/Center of Gravity defuzzification, Center Average defuzzification, Bisector of Area defuzzification, or the like. Alternatively or additionally, output rules may be replaced with functions according to the Takagi-Sugeno-King (TSK) fuzzy model.

A first fuzzy set 504 may be represented, without limitation, according to a first membership function 508 representing a probability that an input falling on a first range of values 512 is a member of the first fuzzy set 504, where the first membership function 508 has values on a range of probabilities such as without limitation the interval [0,1], and an area beneath the first membership function 508 may represent a set of values within first fuzzy set 504. Although first range of values 512 is illustrated for clarity in this exemplary depiction as a range on a single number line or axis, first range of values 512 may be defined on two or more dimensions, representing, for instance, a Cartesian product between a plurality of ranges, curves, axes, spaces, dimensions, or the like. First membership function 508 may include any suitable function mapping first range 512 to a probability interval, including without limitation a triangular function defined by two linear elements such as line segments or planes that intersect at or below the top of the probability interval. As a non-limiting example, triangular membership function may be defined as:

$$y(x, a, b, c) = \begin{cases} 0, \text{ for } x > c \text{ and } x < a \\ \frac{x-a}{b-a}, \text{ for } a \leq x < b \\ \frac{c-x}{c-b}, \text{ if } b < x \leq c \end{cases}$$

a trapezoidal membership function may be defined as:

$$y(x, a, b, c, d) = \max\left(\min\left(\frac{x-a}{b-a}, 1, \frac{d-x}{d-c}\right), 0\right)$$

a sigmoidal function may be defined as:

$$y(x, a, c) = \frac{1}{1 - e^{-a(x-c)}}$$

a Gaussian membership function may be defined as:

$$y(x, c, \sigma) = e^{-\frac{1}{2}\left(\frac{x-c}{\sigma}\right)^2}$$

and a bell membership function may be defined as:

$$y(x, a, b, c,) = \left[1 + \left|\frac{x-c}{a}\right|^{2b}\right]^{-1}$$

Persons skilled in the art, upon reviewing the entirety of this disclosure, will be aware of various alternative or additional membership functions that may be used consistently with this disclosure.

First fuzzy set 504 may represent any value or combination of values as described above, including any software component datum, any source repository datum, any malicious quantifier datum, any predictive threshold datum, any string distance datum, any resource datum, any niche datum, and/or any combination of the above. A second fuzzy set 516, which may represent any value which may be represented by first fuzzy set 504, may be defined by a second membership function 520 on a second range 524; second range 524 may be identical and/or overlap with first range 512 and/or may be combined with first range via Cartesian product or the like to generate a mapping permitting evaluation overlap of first fuzzy set 504 and second fuzzy set 516. Where first fuzzy set 504 and second fuzzy set 516 have a region 536 that overlaps, first membership function 508 and second membership function 520 may intersect at a point 532 representing a probability, as defined on probability interval, of a match between first fuzzy set 504 and second fuzzy set 516. Alternatively or additionally, a single value of first and/or second fuzzy set may be located at a locus 536 on first range 512 and/or second range 524, where a probability of membership may be taken by evaluation of first membership function 508 and/or second membership function 520 at that range point. A probability at 528 and/or 532 may be compared to a threshold 540 to determine whether a positive match is indicated. Threshold 540 may, in a non-limiting example, represent a degree of match between first fuzzy set 504 and second fuzzy set 516, and/or single values therein with each other or with either set, which is sufficient for purposes of the matching process; for instance, augmentation datum 116 may indicate a sufficient degree of overlap with the segment datum 112 for combination to occur as described above. There may be multiple thresholds; for instance, a second threshold may indicate a sufficient match for purposes of past posting and posting query as described in this disclosure. Each threshold may be established by one or more user inputs. Alternatively or additionally, each threshold may be tuned by a machine-learning and/or statistical process, for instance and without limitation as described in further detail below.

In an embodiment, a degree of match between fuzzy sets may be used to rank one resource against another. For instance, if two malicious quantifiers have fuzzy sets matching a malicious component fuzzy set by having a degree of overlap exceeding a predictive threshold, processor 104 may further rank the two resources by ranking a resource having a higher degree of match more highly than a resource having a lower degree of match. Where multiple fuzzy matches are performed, degrees of match for each respective fuzzy set may be computed and aggregated through, for instance, addition, averaging, or the like, to determine an overall degree of match, which may be used to rank resources; selection between two or more matching resources may be performed by selection of a highest-ranking resource, and/or multiple notifications may be presented to a user in order of ranking.

Referring back to FIG. 1, processor 104 may match an augmentation datum 116 to a segment datum 112 when provided augmentation compatibility score 136 is within a predetermined threshold. Augmented video 148 may then be displayed using a display device 144. For instance and without limitation, if augmentation compatibility score 136 of a scene or video is between an 8 and 10 (using the scoring system in a previous example), then the processor 104 may generate an Augmented Video 148. As used in this disclosure, a "predetermined threshold" is a limit and/or range of an acceptable quantitative value and/or combination of values such as an n-tuple or function such as linear function of values, and/or representation related to the scoring of a video 108. Predetermined threshold may be determined by the user of apparatus 100. Additionally or alternatively, predetermined threshold may be determined by processor 104 using a machine learning module 300.

Figure 6:
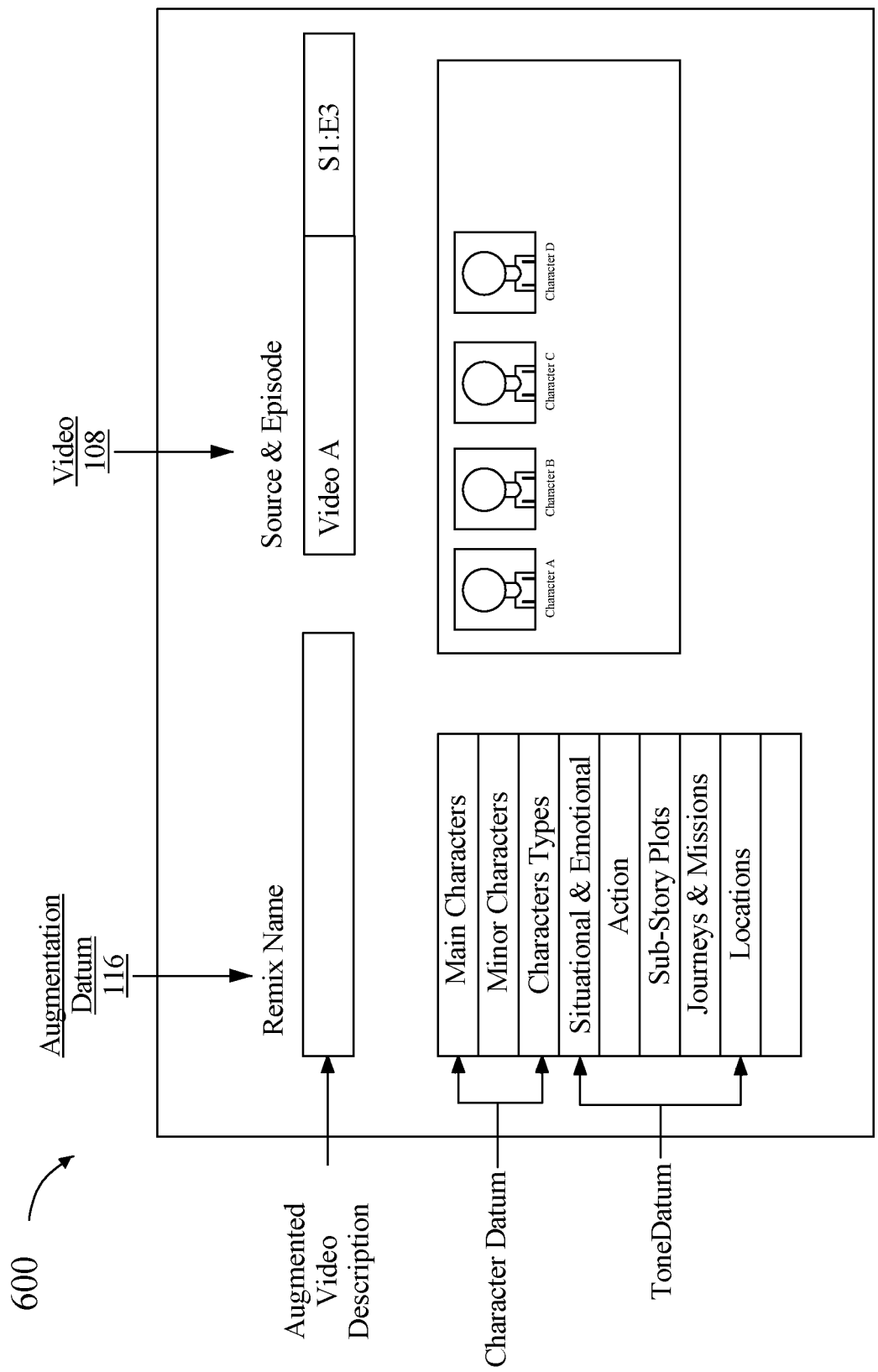
FIG. 6 illustrates an exemplary embodiment of a visual interface.

Referring now to FIG. 6, exemplary embodiment of a visual interface is illustrated. Computing device 104 is configured to provide a visual interface 600. Visual interface 600 may be displayed using include any device suitable for use as computing device 104 or user display, including without limitation an end-user device such as a desktop computer, work terminal, laptop computer, netbook, mobile device such as a smartphone or tablet, or the like. A "visual interface," as used in this disclosure, graphical user interface (GUI) that permits user to manipulate, move, edit, connect together, and/or otherwise interact with Video 108, Augmentation datum 116, a group of pictures, Augmented video 148, Augmentation classification datum 124, Segment datum 112, and/or combinations thereof. Visual interface 600 may include a window in which Video 108, Augmentation datum 116, Augmented video 148, Augmentation classification datum 124, Segment datum 112, and/or combinations thereof, to be used may be displayed. Visual interface 600 may include one or more graphical locator and/or cursor facilities allowing a user to interact with Video 108, Augmentation datum 116, Augmented video 148, Augmentation classification datum 124, Segment datum 112, and/or combinations thereof, for instance using a touchscreen, touchpad, mouse, keyboard, and/or other manual data entry device, Visual interface 600 may include one or more menus and/or panels permitting selection of tools, options, for Video 108 or augmented video 148 to be displayed and/or used, elements of data, functions, or other aspects of video 108 or augmented video 148 to be edited, added, and/or manipulated, options for importation of and/or linking to application programmer interfaces (APIs), exterior services, databases, machine-learning models, classifiers, and/or algorithms, or the like. Persons skilled in the art, upon reviewing the entirety of this disclosure, will be aware of various ways in which a visual interface 600 and/or elements thereof may be implemented and/or used as described in this disclosure.

Figure 7:
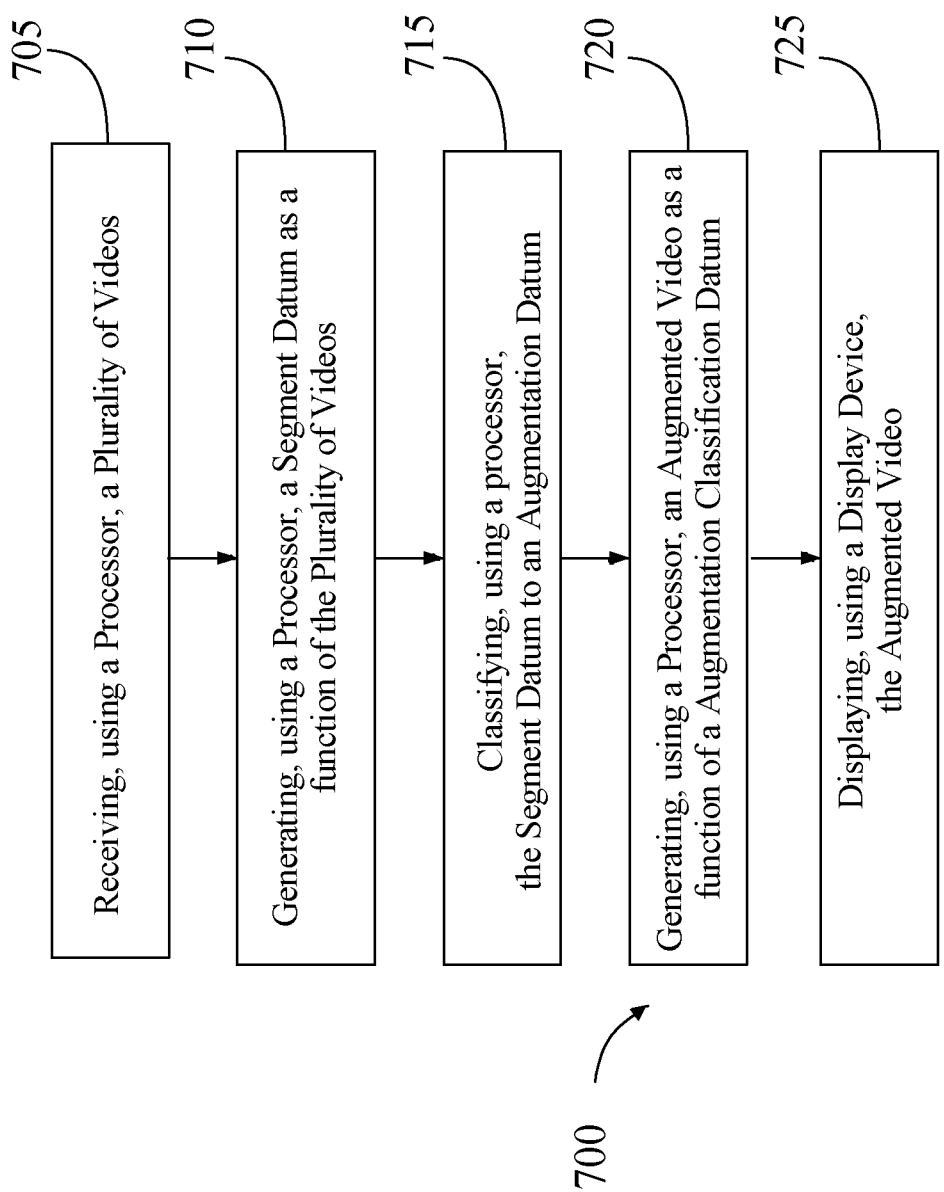
FIG. 7 is a flow diagram of an exemplary method of video augmentation.

Referring now to FIG. 7, an exemplary method 700 for video augmentation is illustrated. At step 705, a processor receives a plurality of videos, without limitation, as described above in reference to FIGS. 1-7.

At step 710, a processor generates a segment datum as a function of the plurality of videos, as described above in reference to FIGS. 1-7.

At step 715, a processor classifies the segment datum to an augmentation datum, as described above in reference to FIGS. 1-7.

At step 720, a processor generates an augmented video as a function of an augmentation classification datum, as described above in reference to FIGS. 1-7.

At step 725, a display device displays the augmented video, as described above in reference to FIGS. 1-7.

Still referring to FIG. 7, processor may be configured to generate the augmentation match datum using fuzzy logic. An augmentation datum may comprise comprised of a rating datum, tone datum, and character datum. The segment datum may be generated as a function of a subject of a video. The processor may generate an augmentation compatibility score. The processor may further be configured to generate the augmented video as a function of the augmentation compatibility score. The video's rating may be augmented as a function of a rating datum.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 8:
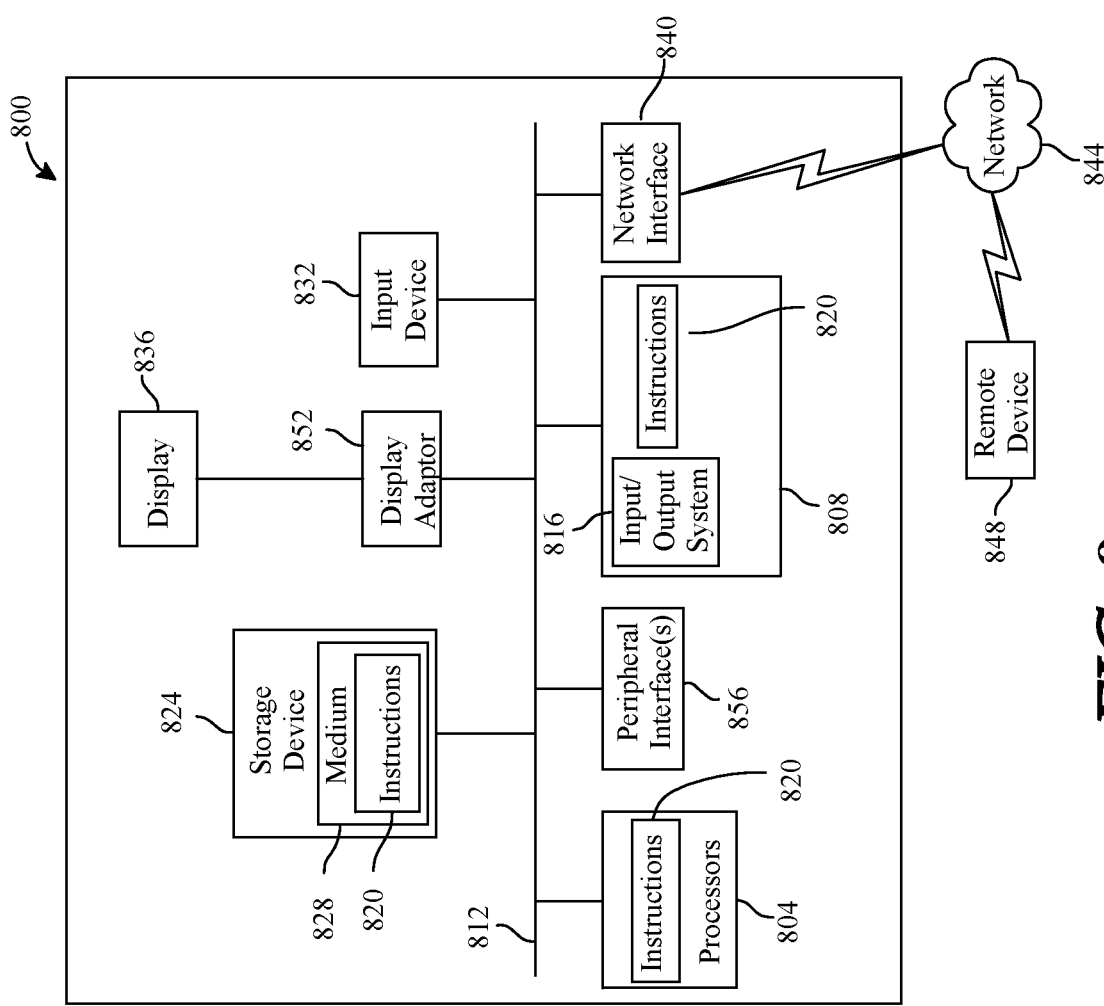
FIG. 8 is a block diagram of a computing system that can be used to implement any one or more of the methodologies disclosed herein and any one or more portions thereof.

FIG. 8 shows a diagrammatic representation of one embodiment of a computing device in the exemplary form of a computer system 800 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 800 includes a processor 804 and a memory 808 that communicate with each other, and with other components, via a bus 812. Bus 812 may include any of several types of bus structures including, but not limited to, a memory bus, a memory controller, a peripheral bus, a local bus, and any combinations thereof, using any of a variety of bus architectures.

Processor 804 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 804 may be organized according to Von Neumann and/or Harvard architecture as a non-limiting example. Processor 804 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 808 may include various components (e.g., machine-readable media) including, but not limited to, a random-access memory component, a read only component, and any combinations thereof. In one example, a basic input/output system 816 (BIOS), including basic routines that help to transfer information between elements within computer system 800, such as during start-up, may be stored in memory 808. Memory 808 may also include (e.g., stored on one or more machine-readable media) instructions (e.g., software) 820 embodying any one or more of the aspects and/or methodologies of the present disclosure. In another example, memory 808 may further include any number of program modules including, but not limited to, an operating system, one or more application programs, other program modules, program data, and any combinations thereof.

Computer system 800 may also include a storage device 824. Examples of a storage device (e.g., storage device 824) include, but are not limited to, a hard disk drive, a magnetic disk drive, an optical disc drive in combination with an optical medium, a solid-state memory device, and any combinations thereof. Storage device 824 may be connected to bus 812 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 824 (or one or more components thereof) may be removably interfaced with computer system 800 (e.g., via an external port connector (not shown)). Particularly, storage device 824 and an associated machine-readable medium 828 may provide nonvolatile and/or volatile storage of machine-readable instructions, data structures, program modules, and/or other data for computer system 800. In one example, software 820 may reside, completely or partially, within machine-readable medium 828. In another example, software 820 may reside, completely or partially, within processor 804.

Computer system 800 may also include an input device 832. In one example, a user of computer system 800 may enter commands and/or other information into computer system 800 via input device 832. Examples of an input device 832 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 832 may be interfaced to bus 812 via any of a variety of interfaces (not shown) including, but not limited to, a serial interface, a parallel interface, a game port, a USB interface, a FIREWIRE interface, a direct interface to bus 812, and any combinations thereof. Input device 832 may include a touch screen interface that may be a part of or separate from display 836, discussed further below. Input device 832 may be utilized as a user selection device for selecting one or more graphical representations in a graphical interface as described above.

A user may also input commands and/or other information to computer system 800 via storage device 824 (e.g., a removable disk drive, a flash drive, etc.) and/or network interface device 840. A network interface device, such as network interface device 840, may be utilized for connecting computer system 800 to one or more of a variety of networks, such as network 844, and one or more remote devices 848 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 844, may employ a wired and/or a wireless mode of communication. In general, any network topology may be used. Information (e.g., data, software 820, etc.) may be communicated to and/or from computer system 800 via network interface device 840.

Computer system 800 may further include a video display adapter 852 for communicating a displayable image to a display device, such as display device 836. Examples of a display device include, but are not limited to, a liquid crystal display (LCD), a cathode ray tube (CRT), a plasma display, a light emitting diode (LED) display, and any combinations thereof. Display adapter 852 and display device 836 may be utilized in combination with processor 804 to provide graphical representations of aspects of the present disclosure. In addition to a display device, computer system 800 may include one or more other peripheral output devices including, but not limited to, an audio speaker, a printer, and any combinations thereof. Such peripheral output devices may be connected to bus 812 via a peripheral interface 856. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions, and additions may be made to that which is specifically disclosed herein without departing from the spirit and scope of the present invention.

What is claimed is:

1. A video augmentation apparatus, wherein the video augmentation apparatus comprises:

at least a processor; and
a memory communicatively connected to the processor, the memory containing instructions configuring the at least a processor to:
  receive a plurality of videos wherein each video of the plurality of videos comprises a plurality of sections, each section of the plurality of sections including a group of pictures representing a scene, wherein the group of pictures includes at least a reference frame;
  identify a group of pictures corresponding to each section using an encoder;
  generate a segment datum as a function of the encoded series of frames of the video of the plurality of videos, wherein generating the segment datum comprises generating a segmentation of the video based on the identification of the plurality of sections;
  receive at least an augmentation datum, wherein the at least an augmentation datum further comprises a user instruction to remove an element of content from the video;
  generate an augmentation classification datum representing at least a group of pictures including the element of content as a function of an augmentation classifier comprising a neural network, wherein:
    the augmentation classification datum comprises at least an augmentation datum;
    and the at least a processor is configured to:
      iteratively train the neural network using a supervised machine-learning algorithm and an augmentation training set, wherein the augmentation training set comprises a plurality of groups of pictures and a plurality of correlated augmentation data representing elements of content; and
      output the augmentation classification datum as a function of the neural network, the segment datum, and the at least an augmentation datum;
  determine an augmentation compatibility score corresponding to the augmentation classification datum and the augmentation datum, wherein:
    the augmentation compatibility score comprises a measurable value representing a relevancy of the augmentation datum to the segment datum; and
    determining the compatibility score comprises utilizing a fuzzy set inferencing system; and
  generate an augmented video as a function of the augmentation classification datum and the compatibility score, wherein generating the augmented video further comprises:
    selecting a group of pictures, of the at least a group of pictures included in the augmentation datum, to be removed as a function of the compatibility score; and
    removing the selected group of pictures; and
  display the augmented video using a user display device, wherein displaying the augmented video comprise optimizing transmission to a display device by:
    encoding the augmented video; and
    transmitting the encoded augmented video to a decoder.

2. The apparatus of claim 1, wherein the augmentation classifier further comprises a fuzzy inferencing system.

3. The apparatus of claim 1, wherein the augmentation datum further comprises a rating datum.

4. The apparatus of claim 3, wherein the video's rating is augmented as a function of a rating datum.

5. The apparatus of claim 1, wherein the augmentation datum further comprises a tone datum.

6. The apparatus of claim 1, wherein the augmentation datum further comprises a character datum.

7. The apparatus of claim 1, wherein the segment datum comprises a video that has be segmented as a function of a subject.

8. The apparatus of claim 1, wherein the processor is further configured to generate an augmentation compatibility score.

9. The apparatus of claim 8, wherein the processor is further configured to generate the augmented video as a function of the augmentation compatibility score.

10. The apparatus of claim 1, further comprising an encoder is configured to:
  encode the augmented video as a function of the augmentation classifier datum; and
  transmit the encoded video to a decoder.

11. A method for a video augmentation apparatus, wherein the video augmentation apparatus comprises:
  receiving, using a processor, a plurality of videos wherein each video of the plurality of videos comprises: a plurality of sections, each section of the plurality of sections including a group of pictures representing a scene, wherein the group of pictures includes at least a reference frame;
  identifying, using the processor, a group of pictures corresponding to each section using an encoder;
  generating, using the processor, a segment datum as a function of the encoded series of frames of the video plurality of videos, wherein generating the segment datum comprises generating a segmentation of the video based on the identification of the plurality of sections;
  receiving, using the processor, at least an augmentation datum, wherein the at least an augmentation datum further comprises a user instruction to remove an element of content from the video
  generating, using the processor, an augmentation classification datum as a function of an augmentation classifier comprising neural-network based, wherein:
    the augmentation classification datum comprises at least an augmentation datum;
    generating, using at least a processor, the augmentation classification datum as a function of the neural-network, wherein the at least a processor is configured to:
      iteratively train, by the processor, the neural-network using augmentation training set, wherein the augmentation training set comprises a segment datum correlated to at least an augmentation datum; and
      output, by the processor, the augmentation classification datum as a function of the neural-network, the segment datum, and the at least an augmentation datum and the augmentation training set;
  determining, using the processor, an augmentation compatibility score corresponding to the augmentation classification datum and the augmentation datum, wherein:
    the augmentation compatibility score comprises a measurable value representing a relevancy of the augmentation datum to the segment datum; and
    determining the compatibility score comprises utilizing a fuzzy inference system; and
  generating, using the processor, an augmented video as a function of an augmentation classification datum and the compatibility score, wherein generating the augmented video further comprises:

selecting a group of pictures, of the at least a group of pictures included in the augmentation datum, to be removed as a function of the compatibility score; and removing the selected group of pictures; and displaying, using the display device, the augmented video, wherein displaying the augmented video comprise optimizing transmission to a display device by:
encoding the augmented video; and
transmitting the encoded augmented video to a decoder.

12. The method of claim 11, wherein an augmentation classifier further comprises a fuzzy inferencing system.

13. The method of claim 11, wherein the augmentation datum further comprises a rating datum.

14. The method of claim 13, wherein the video's rating is augmented as a function of a rating datum.

15. The method of claim 11, wherein the augmentation datum further comprises a tone datum.

16. The method of claim 11, wherein the augmentation datum further comprises a character datum.

17. The method of claim 11, wherein the segment datum comprises a video that has be segmented as a function of a subject.

18. The method of claim 11, wherein the processor is further configured to generate an augmentation compatibility score.

19. The method of claim 18, wherein the processor is further configured to generate the augmented video as a function of the augmentation compatibility score.

20. The method of claim 11, wherein the wherein an encoder is configured to transmit a residual signal as a function of the augmentation classifier datum.

* * * * *